US005450190A

United States Patent [19]

Schwartz et al.

[11] Patent Number: 5,450,190

[45] Date of Patent: Sep. 12, 1995

[54] COMPOSITION, METHOD AND APPARATUS FOR PROVIDING A CODED HIDDEN IDENTIFICATION ON A SELECTED PRINTABLE ITEM BY A CODED PRINTING COMPOSITION

[75] Inventors: Abraham Schwartz, Durham, N.C.; Gary A. Woodward, Alexandria, Va.

[73] Assignee: Caribbean MicroParticles Corp., Hato Rey, P.R.

[21] Appl. No.: 61,596

[22] Filed: May 13, 1993

[51] Int. Cl.$^6$ .................... G06K 9/74

[52] U.S. Cl. .................... 356/71

[58] Field of Search .................... 356/71

[56] References Cited

U.S. PATENT DOCUMENTS

| | | | |
|---|---|---|---|
| 3,500,047 | 3/1970 | Berry | 350/71 |
| 4,053,433 | 10/1977 | Lee | 252/408 |
| 4,146,792 | 3/1979 | Stenzel et al. | 356/71 |
| 4,451,521 | 5/1984 | Kaule et al. | 356/71 |
| 4,451,530 | 5/1984 | Kaule et al. | 356/71 |
| 4,767,205 | 8/1988 | Schwartz et al. | 356/71 |
| 5,208,630 | 5/1993 | Goodbrand et al. | 355/201 |

OTHER PUBLICATIONS

Advertisement "Code-B TM MicroTracers: The Latest in Latent Marking Systems for Paper", Caribbean Microparticles Corp., Jul. 1987.

Advertisement "Code-B MicroTracers: The Latest in Latent Marking Systems for Paper", Caribbean Micro Particles Corp., Jul. 1987.

*Primary Examiner*—Richard A. Rosenberger
*Assistant Examiner*—Jason D. Eisenberg
*Attorney, Agent, or Firm*—Olive & Olive

[57] ABSTRACT

A coded hidden identification is provided for a selected printable item by providing a coded printing composition based on adding to and substantially uniformly mixing a selected number of populations of microparticles with a printing composition, said microparticles being normally invisible to the human eye and each such population having a group of microparticles of similar size, shape or color to form a combination of highly uniform and unique properties, the printing composition adapted for use in a printing machine, such as a photocopy or laser printing machine cartridge, and printing items with the coded printing composition so as to transfer the microparticles to the item. The microparticles may be characterized by a number of detectable properties, or a combination thereof, which are not detectable by the human eye to provide the coded hidden identification. The microparticles may contain, for example, a fluorescent dye and be made to fluoresce to reveal the identification, or they may be of a form such that magnification may be used to reveal the hidden identification.

21 Claims, No Drawings

COMPOSITION, METHOD AND APPARATUS FOR PROVIDING A CODED HIDDEN IDENTIFICATION ON A SELECTED PRINTABLE ITEM BY A CODED PRINTING COMPOSITION

FIELD OF THE INVENTION

The invention relates broadly to establishing a hidden identification by embedding in an item a population of normally invisible particles having physical properties corresponding to a code and then with detecting means appropriate to the nature of the particles, detecting the properties to determine the code. More specifically, in the illustrated embodiment, the invention relates to a composition, method and apparatus for identifying printed papers and the like in a hidden manner by incorporating a population or group of normally invisible microparticles such as microbeads of controlled shape, size and color in the printed item to establish an identifiable code detectable with a light microscope or with a light source designed to make the beads fluorescent. By "microparticle" is meant a particle whose size is below the resolution of the eye. By the term "microbead" is meant a spherical form of a microparticle.

BACKGROUND ART

Various means for marking and identifying items in hidden ways is discussed in U.S. Pat. No. 4,767,205, the teachings of which are incorporated herein by reference.

Microbeads, which are spherical particles, consisting of polymeric materials of specific sizes and color or fluorescence have been used singly or in combinations to provide unique codes which are defined by the sizes and colors of the microbeads as more fully described in the referred to U.S. Pat. No. 4,767,205, this patent also describes use of microbeads in epoxy media to mark equipment and in paper or inks to mark printed materials such as documents, stamps, money and lottery tickets. This patent further identifies other patents and information, all deemed incorporated herein by reference, which teach methods of making microbeads with sufficient uniformity of shape, color and size as to be suitable for the present invention.

Fluorescent dyes have specific properties which are related to their appearance with respect to the wavelength of light with which they are excited and the barrier filters with which they are viewed. The manner in which fluorescent dyes may provide codings equivalent to specific colors is also more fully described in the previously mentioned U.S. Pat. No. 4,767,205.

However, what has not heretofore been recognized is the possibility of creating a coded identification on a multiplicity of documents or other items by incorporating the coding composition mixed in with a composition like that found in a toner cartridge such that the coding can be carried out automatically, for example, as part of a photocopy or laser printing operation.

Toner cartridges such as used in photocopy machines and laser printers generally contain a composition of particles hereafter referred to as "toner particles". The XEROX™ dry ink cartridge 5012/5014/1012 is advertised as comprising Styrene Acrylate Polymer; Iron Oxide; Polypropylene Blue Wax; Quaternary Ammonium Salt; and Amorphous Silica. The toner particles are attracted to drums which have electrostatic patterns placed on them to match the print or copy patterns desired. These particles are non-fluorescent and provide a black background when viewed by eye or under a microscope.

The object of the invention thus becomes that of providing a coding composition, method and apparatus for creating a hidden identification based on incorporating the coding composition with another printing composition confined in a container such as a toner cartridge such that the coding can be applied while other printing or copying processes take place.

A more specific object is to provide a toner cartridge composition suited for a normal printing purpose as well as for use in applying a hidden identification that can later be detected making use of fluorescent or other properties of the coding composition.

Other objects will become apparent as the description proceeds.

SUMMARY OF THE INVENTION

The present invention is directed in the described embodiment to a composition, method and apparatus for hidden identification based on use of a coded toner composition consisting of microparticles and particularly one or more populations or groups of microbeads of specific sizes and fluorescent properties and/or colors added to and uniformly mixed with toner particles such that when the toner particles incorporating such microbeads are placed in a cartridge and used in a laser printer or photocopy machine, each resulting copy will consist of intended to be printed and visible images, words or pictures, and will also contain, intermixed with the toner particles, the fluorescent or colored microbeads which even though typically invisible provide the desired coding. Such microbeads while not visible to the naked eye, can be made visible under sufficient and appropriate magnification. In the case where the microbeads contain fluorescent dyes, the microbeads would typically not be readily visible even under magnification, but can be made visible under the proper excitation wavelengths and emission barrier filters. The microbeads will be present for the most part, only within the areas which contained printed characters or design. The typically black background provides enhanced contrast for the fluorescent particles.

Specific codes of microbeads are defined by the specified diameters and fluorescent/colored properties of the mixture of specific microbead populations. Emission from the particles act as pin point sources of light and lend themselves to being detected by automated instruments such as fluorescent scanners with or without magnification optics.

The codes as such cannot be copied with the usual photocopy machine. If the coded print is copied, the microbeads are typically too small to have their image reproduced on copies. In any event, any such copy will not contain the fluorescent/colored material and therefore the copy will not contain the code.

DETAILED DESCRIPTION OF THE INVENTION

Coded toner is prepared by adding 0.01–10% (by weight) of dry microbeads of one or more microbead populations, each population having specific size and fluorescence or colored properties, to toner particles and mixing thoroughly. Insofar as is practical, the microbeads should be uniformly mixed with the toner particles. The toner containing the microbeads is then loaded into a cartridge used for a laser printer or for a photocopy machine following which the normal printing or copying process is carried out resulting in production of the coded item such as a paper document. It has been found that the microbeads do riot tend to dissolve or degrade in this process and thus can be detected as next described.

The code for the particular toner cartridge can be discerned by observing the printed material created from the coded toner composition under magnification, when appropriate, or under a fluorescence microscope and identifying the presence of the specific population or several populations of microbeads with respect to their size and fluorescent/color properties all as more specifically described in the previously referred to U.S. Pat. No. 4,767,205.

An alternate method of detection is by scanning the printed material with instruments which detect the fluorescence of the print due to the fluorescent properties of the mixture of microbeads. For example, a system such as the IC-300 TM fluorescence image acquisition and analysis system (Inovision, Research Triangle Park, N.C.) can be used to determine if fluorescent microparticles are present in the print.

It has been discovered that in this method, the microbeads tend to uniformly disperse in the toner particles, do not tend to dissolve and tend to withstand the laser printing or photocopy process without being degraded.

Having generally described the invention, various examples are next described.

EXAMPLE 1

Add 1% by weight of dry microbeads which are 9μ in diameter and which are labelled with acridine orange dye to photocopy machine toner particles and mix thoroughly to obtain a substantially uniform mix. Load a 1012 XEROX TM toner cartridge with this mixture and install the cartridge into the 1012 XEROX TM machine. Operate the machine normally and observe the copies under a fluorescence microscope using blue (485 nm) light and a 520 nm bandpass filter. An ALCOR TRUECOPY TM acid-free white paper was used in the machine. The black letters and designs are found to contain the acridine orange microbeads which show up as bright yellow spheres against the black of the letters and design. The 9μ size is verified by conventional size measuring equipment.

EXAMPLE 2

A 1.5% by weight mixture of 9μ acridine orange labeled microbeads with 5μ HOECHST TM 33342 labeled microbeads is made up and added to the toner particles. A cartridge is loaded as in Example 1 and copies of printed material are made. Upon examination of the copies under blue (485 nm) excitation and a 520 nm filter, the acridine orange microbeads appear bright yellow and the HOECHST TM 33342 microbeads are not visible. Under 465 nm excitation light and a 490 nm filter, the HOECHST TM 33342 microbeads appear bright blue and the acridine orange microbeads are not visible. The respective 9μ and 5μ sizes are measured and verified.

EXAMPLE 3

Copies produced in Examples 1 and 2 are copied on a machine with a normal toner cartridge and examined under a fluorescence microscope. No microbeads or fluorescence are observed in the printed areas of the new copies.

EXAMPLE 4

The mixtures of fluorescent microbeads and toner particles in Examples 1 and 2 are loaded into a toner cartridge of an APPLE LASERWRITER II TM printer and documents are printed. The microbeads are not visible to the naked eye or under magnification, however, under the appropriate excitations, as specified in Examples 1 and 2, the microbeads are clearly visible under magnification (100×). The microbead sizes are also verified as previously described.

With the foregoing examples and description in mind, it is to be appreciated that by increasing the number of populations, as explained in U.S. Pat. No. 4,767,205, the possible code combination can be dramatically increased. Also to be recognized is that properties other than color, size or shape such as magnetic, radioactive or like properties which do not add visibility to the microparticles but which can be detected lend themselves to the invention.

What is claimed is:

1. A method of printing in which a printed item is given a coded identification, comprising:

(a) making up a selected number of populations of microparticles, said microparticles being of a non-encapsulated, non-layered form normally invisible to a human eye and each such population comprising a group of microparticles having a combination of highly uniform properties selected from the properties of shape, size, uniformly dispersed color and uniformly dispersed fluorescence which combination of properties establishes a coded identification, any of which can be selectively detected after said microparticles have been transferred to a printed item;

(b) making up a non-coded printing composition for use exclusively in an electrostatic printing machine;

(c) adding to and substantially uniformly mixing said selected number of populations of microparticles with said printing composition to form a coded printing composition such that when said selected number of populations of microparticles are added and mixed with said printing composition they do not themselves dissolve or degrade or impair or degrade the utility of the printing composition, and they maintain their said properties and the high uniformity thereof and permit said printing composition contained in said coded printing composition to remain non-coded and to be used in its customary manner;

(d) installing said coded printing composition in a container from which said coded printing composition is dispensed during printing by an electrostatic printing machine to which said container is mounted; and (e) printing a selected number of items with said printing machine thereby causing at least a portion of said selected number of populations of microparticles within said coded printing composition to be transferred to at least a portion of the printed areas of each item printed and thereby providing a detectable coded identification in such areas to which said microparticles are transferred.

2. The method of claim 1 wherein said selected number of populations of microparticles within said coded printing composition comprises up to about ten percent by weight of said composite coded printing composition.

3. The method of claim 1 including the step of examining the items so printed with means appropriate to the nature of the microparticles for revealing the size, shape or color thereof and for making such microparticles visible to verify the identification established by said combination.

4. The method of claim 3 wherein said means for making said microparticles visible comprises a microscope to magnify and make said microparticles visible.

5. The method of claim 1 wherein said microparticles are labelled with a fluorescent dye and including the step of examining the transferred microparticles under a microscope with a light source effective to cause said microparticles to fluoresce.

6. The method of claim 1 wherein said printing machine comprises a photocopy machine, said container comprises a cartridge used by said photocopy machine and said printing composition prior to the addition of said microparticles comprises uncoded toner particles contained in said cartridge and said printing comprises photocopying.

7. The method of claim 1 wherein said printing machine comprises a laser printing machine, said container comprises a cartridge used in said laser printing machine and said printing composition prior to the addition of said microparticles comprises uncoded toner particles contained in said cartridge and said printing comprises laser printing.

8. The method of claim 1 wherein said microparticles comprise microbeads.

9. The method of claim 1 further comprising the step of scanning said items after said printing with a fluorescence image acquisition and analysis system.

10. A method of printing as claimed in claim 1 wherein:

(a) said selected number of populations of microparticles comprises a plural number of populations of microparticles;

(b) said combination of highly uniform properties in each population of microparticles differs from the highly uniform properties in all other populations of microparticles; and (c) the highly uniform particles in each population can be detected without detecting the highly uniform particles in another population.

11. A coded printing composition for printing a coded identification of a selected item, comprising:

(a) a selected number of populations of microparticles, said microparticles being normally invisible to a human eye and each such population comprising a group of microparticles of a non-encapsulated, non-layered form and having a combination of highly uniform properties selected from the properties of shape, size, uniformly dispersed color and uniformly dispersed fluorescence, any of which can be selectively detected after said microparticles have been transferred to the item;

(b) a non-coded printing composition for use exclusively in an electrostatic printing machine; and (c) said microparticles being added to and substantially uniformly mixed with said printing composition to form a coded printing composition in which said microparticles themselves do not dissolve or degrade or impair or degrade the utility of the printing composition and maintain their said properties and the high uniformity thereof and permit said printing composition contained in said coded printing composition to remain non-coded and be used in its customary manner.

12. The coded printing composition of claim 11 in which said selected number of populations of microparticles comprises up to about ten percent by weight of said coded printing composition.

13. A coded printing composition according to claim 11 wherein said microparticles comprise microbeads labelled with a fluorescent dye.

14. A photocopy machine cartridge filled with the coded printing composition of claim 13.

15. A laser machine cartridge filled with the coded printing composition of claim 13.

16. A coded printing composition according to claim 11 wherein said microparticles are of a form which when magnified are made visible.

17. A coded printing composition according to claim 11 wherein said printing composition comprises uncoded toner particles of the type used in a cartridge for a photocopy machine.

18. A coded printing composition according to claim 11 wherein said printing composition comprises uncoded toner particles of the type used in a cartridge for a laser printing machine.

19. A photocopy machine cartridge filled with the coded printing composition of claim 11.

20. A laser machine cartridge filled with the coded printing composition of claim 11.

21. A method of determining whether particular printed items printed by electrostatic printing have been printed with a coded printing composition, comprising:

(a) providing a coded printing composition comprising a non-coded printing composition for use exclusively in an electrostatic printing machine and having up to about ten percent by weight of non-encapsulated non-layered, microparticles having a uniform and uniformly dispersed fluorescence property and of a substantially uniform shape and size normally invisible to a human eye but detectable when used during printing by fluorescence detectors; and (b) scanning said printed items with a fluorescence image acquisition and analysis system to determine if fluorescent microparticles are present.

* * * * *

UNITED STATES PATENT AND TRADEMARK OFFICE
CERTIFICATE OF CORRECTION

PATENT NO. : 5,450,190

DATED : September 12, 1995

INVENTOR(S) : Abraham Schwartz, et al.

It is certified that error appears in the above-indentified patent and that said Letters Patent is hereby corrected as shown below:

Column 3, line 4, correct "riot" to read --not--.

Signed and Sealed this

Seventh Day of November, 1995

Attest:

BRUCE LEHMAN

*Attesting Officer*

*Commissioner of Patents and Trademarks*